Patented July 4, 1950

2,513,274

UNITED STATES PATENT OFFICE 2,513,274

RAPID-CURING PHENOLIC RESINS

Raymond A. Barkhuff, Jr., Springfield, Mass., assignor to Monsanto Chemical Company, St. Louis, Mo., a corporation of Delaware No Drawing. Application January 18, 1947, Serial No. 722,951

7 Claims. (Cl. 260—33.4)

This invention relates to phenolic resins having a high rate of cure. More particularly, this invention relates to phenolic resins having a high rate of cure at relatively low temperatures.

Phenol-formaldehyde resins of the so-called casting type which are made by reacting 2–3 mols of formaldehyde with 1 mol of phenol under alkaline conditions followed by neutralization with a weak acid are well known to those skilled in the art. However, the use of these resins has been restricted by virtue of their low curing rates. Attempts to remedy such disadvantages by the use of strong acid catalysts have not been entirely successful.

It is an object of this invention to provide phenol-formaldehyde resins having a high rate of cure at moderately raised temperatures. A further object of this invention is to provide a method for increasing the curing rate of phenol resins of the casting type.

These and other objects are attained by incorporating into liquid casting-type phenol-formaldehyde resin containing 2–3 mols of combined formaldehyde for every mol of phenol, a phenol-formaldehyde-resorcinol resin. It has been discovered that such a combination of resins retains its fluidity for substantial periods of time at room temperature, yet sets to a hard, infusible, insoluble product in a relatively short time at elevated temperatures.

The following examples are illustrative of the present invention, but are not to be construed as limitative thereof. Where parts are mentioned, they are parts by weight.

*Preparation of resin "A"*

| | Parts |
|---|---|
| Phenol | 100 |
| Formalin (37% $CH_2O$) | 217 |
| Sodium hydroxide | 3 |
| Lactic acid (44% aqueous solution) | 15.3 |

The phenol, Formalin and sodium hydroxide are mixed in a suitable vessel equipped with a water-cooled return condenser and the resulting mixture is heated and stirred at 75° C. under sufficiently reduced pressure so that refluxing occurs. The heating and stirring are continued until the amount of formaldehyde in the reflux condensate is reduced to 1.8–2.1%. The viscosity of the reaction product at this point is 100–150 centipoises at 25° C. The lactic acid is then added and the acidified resin is dehydrated under an absolute pressure of 1–5 inches of mercury and at a temperature not exceeding 60° C. until the water content is reduced to about 9% (Fischer method). The viscosity is such that after the addition of 20 parts of ethanol to improve the storage stability of the resin, the product has a viscosity of 400–800 centipoises at 25° C.

*Preparation of resin "B"*

| | Parts |
|---|---|
| Phenol | 100 |
| Formalin (37% $CH_2O$) | 258 |
| Sodium hydroxide | 5 |
| Lactic acid (44% aqueous solution) | 24 |

The phenol, Formalin and caustic soda are mixed in a suitable vessel equipped with a water-cooled return condenser and the resulting mixture is heated and stirred at 70° C. under sufficiently reduced pressure so that refluxing occurs. The heating and stirring are continued until the amount of formaldehyde in the reflux condensate is reduced to 3.5–4.0% by weight. The lactic acid is then added to neutralize the resin and produce a pH of about 5.5. The acidified resin is dehydrated under low absolute pressure, i. e., 1–5 inches of mercury, and at a temperature of not over 50–55° C. until the water content is reduced to about 9% (Fischer method). The resulting resin is stabilized for storage purposes by the addition of about 20 parts of ethanol and cooled to room temperature. A yield of about 230 parts of stabilized product is obtained which has a viscosity of about 1000 centipoises at 25° C.

*Preparation of resin "C"*

| | Parts |
|---|---|
| Phenol | 100 |
| Formalin (37% $CH_2O$) | 110 |
| Hydrated lime | 3 |
| Resorcinol | 65 |

The phenol, Formalin and a slurry of the lime in 9 parts of water are mixed in a suitable vessel equipped with a water-cooled return condenser and the mixture heated and stirred at 80° C. under sufficiently reduced pressure to cause the mixture to reflux. The heating and stirring are continued until the product has a viscosity of 16–18 centipoises at 25° C., substantially all of the Formalin then being reacted. After cooling to about 60° C. the resorcinol is added and the mixture heated at 80° C. until the product has a viscosity of 40–60 centipoises at 25° C. The mixture is then dehydrated under low absolute pressure, i. e., 1–5 inches of mercury and at a temperature of 45–55° C. until the water content is reduced to about 8.5% (Fischer method). The product is stabilized for storage purposes by the addition of 20 parts of ethanol and cooled to room temperature. A yield of about 215 parts of stabilized product is obtained which has a viscosity of about 1000 centipoises at 25° C.

*Preparation of resin "D"*

|  | Parts |
|---|---|
| Phenol | 100 |
| Formalin (37% $CH_2O$) | 100 |
| Barium hydrate | 21.2 |
| Water | 21.2 |
| Resorcinol | 50 |

The phenol, Formalin and barium hydrate (slurried in the water) are mixed in a suitable vessel equipped with a water-cooled return condenser and the resulting mixture heated at 75° C. under a sufficiently reduced pressure to cause the mixture to reflux. The heating is continued until the product has a viscosity of 14–17 centipoises at 25° C., substantially all of the formaldehyde then being reacted. The resorcinol is then added and the mixture is refluxed at 100° C. until the product has a viscosity of 40–60 centipoises at 25° C. The resin is then dehydrated at an absolute pressure of 1–5 inches of mercury and a temperature of 45–55° C. until the water content is reduced to about 8.5% (Fischer method). The product is stabilized for storage purposes by the addition of 20 parts of ethanol and then has a viscosity of about 800 centipoises at 25° C.

*Example I*

A mixture of equal parts of stabilized resin "B" and stabilized resin "C" is prepared. To this mixture is added about 5% of hexamethylene tetramine, based on the weight of the mixture. The resulting product, after being brought to a temperature of 60° C. gels in about ½ hour and sets to a very hard, infusible, insoluble product in about 5–10 hours.

*Example II*

A mixture of equal parts of stabilized resin "A" and stabilized resin "C" is prepared. To this mixture is added about 10% of hexamethylene tetramine based on the weight of the resin mixture. The resulting product, after being brought to a temperature of 60° C. gels in about 1½ hours.

Aside from a somewhat slower setting rate, the product of this example is similar in its characteristics to the product of Example I.

*Example III*

Stabilized resin "A" and stabilized resin "D" are mixed in equal proportions by weight. An amount of paraformaldehyde to the extent of 4% by weight, based on the weight of the mixture, is added. The resulting product gels in about ¾ hour after being brought to a temperature of 60° C. and sets to an insoluble, infusible product in 8–12 hours.

This product is intermediate in its rate of setting and hardening at moderately elevated temperatures, between the products of Examples I and II.

Numerous variations may be introduced into the preparation of the resin combination of the invention. For example, the preparation of the casting type resin may be subject to many variations as is well known to those skilled in the art of preparing casting resins.

Thus, the ratio of formaldehyde to phenol on a molar basis may vary from 2:1 to 3:1, or even higher, for example, 5:1, although when ratios higher than about 3:1 are used, the excess formaldehyde is not believed to enter into the usual reaction with phenol. Various alkalies may be used to catalyze the reaction. Usually the nature and amount of alkaline material is such as to produce a pH of about 8.5–9.5. For this purpose, such alkalies as sodium hydroxide, potassium hydroxide, sodium bicarbonate, potassium bicarbonate, quaternary ammonium bases and the like may be used. As neutralizing acids, various weak acids of low volatility are suitable, particularly organic hydroxy acids such as lactic acid and glycollic acid, dicarboxylic acids such as phthalic acid, maleic acid, succinic acid, malic acid and mixtures of the foregoing acids.

Neutralization is usually effected before any substantial amount of condensation between phenol alcohols occurs as is evidenced by a rapid rise in viscosity of the reaction mixture. In terms of free formaldehyde content, this point in the reaction will depend on the formaldehyde:phenol ratio used. When a 3:1 molar ratio is used, the neutralization is preferably effected when the free formaldehyde content of the reflux condensate is reduced to 3–6%. When lower proportions of formaldehyde are used, neutralization is preferably effected after the free formaldehyde content has been reduced to somewhat lower values, for example, when a 2.5:1 formaldehyde-phenol molar ratio is used, the free formaldehyde is preferably reduced to 1–3% before the resin is neutralized and when a 2:1 formaldehyde-phenol molar ratio is used, the free formaldehyde is preferably reduced to not over 1.5% before the resin is neutralized.

The amount of neutralizing acid which is added is sufficient to reduce the pH to between 4.5 and 7 and preferably to between 5 and 6 to provide a stable resin.

The rate and extent of dehydration should be such that the product has a water content of not over 12%, preferably not over 10%, and after the addition of 20 parts of ethanol for every 100 parts of phenol originally present, a viscosity of not over 8000 and preferably 200–1200 centipoises at 25° C.

In preparing the phenol-resorcinol-formaldehyde resin, the molar ratio of formaldehyde to phenol may be varied from about 1:1 to about 1.5:1. With respect to the amount of resorcinol incorporated in this resin, it is preferred that from 40–90 parts of resorcinol be used for every 100 parts of phenol. It is further preferred that the addition of the resorcinol be delayed until substantially all of the formaldehyde is reacted with the phenol as is illustrated by the process described in making resins "C" and "D." However, if desired, the addition of the resorcinol may be delayed until condensation of the phenol alcohols has partially taken place. However, it is preferred that resorcinol be added prior to any substantial condensation between phenol alcohol molecules, as evidenced by a rapid increase in viscosity.

The extent of the reaction of the resorcinol prior to dehydration may be substantially varied. In the preparation of resins "C" and "D" the reaction is shown as continued until the mixture has a viscosity of 40–60 centipoises. Other degrees of reaction may be effected, for example until the reaction mixture has a viscosity of 25–100 centipoises at 25° C. However, it is desirable that the reaction prior to dehydration be continued at least until substantially all of the resorcinol has been reacted.

In general, the extent of the reaction prior to dehydration should be so correlated with the extent of reaction during dehydration so that a product is obtained with a water content of not over 12% and preferably not over 10%, and after the addition of 20 parts of ethanol for every 100 parts of phenol originally present, a viscosity of not over 8000 centipoises and preferably 600–1200 centipoises, at 25° C.

In place of the hydrated lime and barium hydrate used in the examples, other alkaline catalysts may be used in preparing the phenol-resorcinol-formaldehyde resin, as for example sodium hydroxide, potassium hydroxide, the corresponding carbonates and the like. Metallic hydroxides in which the metals are from the alkaline earth group represent a preferred class of catalysts. Usually not more than 10 parts of hydrated lime or a stoichiometrically equivalent amount of other alkaline catalysts are employed for every 100 parts of phenol.

The resin combination may comprise various proportions of the two types of resin. However, it has been unexpectedly discovered that unexpectedly high rates of cure result if the proportion of the phenol-resorcinol resin is such that the ratio of combined phenol in the mixture of the two resins is not below about 25 parts or above about 45 parts of resorcinol for every 100 parts of phenol. This is clearly shown by the following table in which the effect of various proportions of resins "B" and "C" on the gel time of mixtures thereof is set forth.

The gel times given in the table are determined by placing 20 grams of the resin combination in a test tube 6 inches long and 1 inch in diameter, adjusting the temperature of the tube and its contents to 30° C., immersing the tube and its contents in an oil (heavy mineral oil) bath at 70° C. to a point above the resin combination level, stirring the resin combination with a glass rod until its temperature reaches 70° C. and allowing the tube to stand without agitation until the resin combination is sufficiently set to support the weight of the tube for 1–2 seconds when a glass rod immersed therein is slowly withdrawn. The gel time is the overall time from immersion in the oil bath to the gel point.

is present, since it is desirable that the gel time of the resin not exceed 15 minutes at 70° C. for many applications.

As shown in the examples, the two resin components are stabilized by the incorporation of about 10% of ethanol therein. In place of ethanol, other stabilizers may be used. Among the preferred stabilizers are alkanols having 1–5 carbon atoms, i. e. methyl, ethyl, propyl, butyl and amyl alcohols, usually in the proportion of 2–20 parts for every 100 parts of the sum of the resin components. Other stabilizers are the polyhydric alcohols mentioned hereinafter in connection with cork binder compositions.

The inclusion of a stabilizer is desirable when the sealant components are to be stored for a substantial period of time, e. g., several weeks and/or when it is desired that the viscosity of the resin mixture be kept low during the sealing operations. On the other hand, if the resin components are to be combined and used within a few days, a stabilizer may be omitted, although it may still be advantageous to incorporate a stabilizer when the resins are mixed, to maintain a low viscosity.

The resin combinations of the invention are useful for many purposes by virtue of their unusually rapid hardening rates coupled with the fact that they are flowable at ordinary temperatures. Thus, wood, metals, concrete, cloth, paper, glass, etc., may be coated with the products of the invention.

An additional feature of the products of the invention resides in their highly effective penetrating qualities so that they lend themselves to impregnation of such porous metals, e. g., iron, aluminum and magnesium castings, etc. An effective procedure for impregnating such materials as wood and porous metals is to remove air from the article to be impregnated by vacuum treatment in a suitable vessel and, without releasing the vacuum, introduce the resin combination of the invention, free from volatile solvents, so as to immerse the article, then admit air or other gas under pressure, e. g., 50–100 pounds per square inch. Finally, the impregnated article is removed and the resin cured by Table

| | | | | | |
|---|---|---|---|---|---|
| Stabilized resin "B" (parts) | 70 | 60 | 50 | 40 | 30 |
| Stabilized resin "C" (parts) | 30 | 40 | 50 | 60 | 70 |
| Per cent resorcinol (based on phenol) | 20.5 | 27.1 | 33.6 | 40.1 | 46.6 |
| Hexamethylenetetramine (parts) | 5 | 5 | 5 | 5 | 5 |
| Gel time | 15′35″ | 13′40″ | 11′40″ | 12′25″ | 17′0″ |

In contrast to the process of the invention, if resin "C" is replaced by recorcinol per se in the same amount as is present in resin "C," a substantially slower rate of cure occurs. This disadvantage is not rectified by the inclusion of additional formaldehyde along with the resorcinol.

In further contrast to the process of the invention, the mixture of resins "B" and "C" cures at a far higher rate than does a mixture of 100 parts of resin "C" and about 10 parts of hexamethylenetetramine. In other words, resins "B" and "C" appear to represent a specific combination having an exceptionally high rate of cure and in which each component is critical as regards the rate of cure of the combination.

As shown in the examples, hexamethylenetetramine, paraformaldehyde, or other formaldehyde-generating agents, such as trioxymethylene, etc., may be included in the resin combination. Thus, it is desirable to include 2–10% of such an accelerating agent, based on the total amount of resin, particularly if a stabilizer such as ethanol heating, e. g., at 40–100° C. By virtue of the low curing temperatures, materials subject to deterioration on being subjected to high temperatures may be readily given an infusible, insoluble coating and/or impregnating treatment.

Another valuable use of the products of the invention is their use as binding agents for various types of fillers, e. g., wood flour, cork, walnut shell flour, powdered silica, comminuted infusible phenol-aldehyde resin, abrasive grains, etc., and then molding the resulting compositions under heat and pressure to form infusible insoluble products. For example, abrasive grains, e. g., #6 aluminum oxide, #46 silicon carbide, or boron carbide abrasive grains, may be bonded with the products of the invention to form grinding wheels of high strength or by applying the resin combinations, especially if a glycol or glycerine is included as a plasticizer, to a backing, e. g., glass cloth, imbedding abrasive grains therein and finally curing the product.

Another use of the resin combinations of the invention is as a base material for the so-called "foamed resin" wherein gasifying agents such as inert gases, e. g., nitrogen, mixtures of carbonates and acids to produce $CO_2$, etc. are used to expand the resin which is then cured in the expanded state.

Particularly valuable products are obtained by using the products of the invention as binding agents for cork particles. The resulting products are especially useful as gasket materials. The following example illustrates the preparation of such materials.

*Preparation of resin "E"*

The preparation of resin "A" is repeated except that neutralization is not effected until the formaldehyde content of the reflux condensate is reduced to 1–1.5% and the viscosity of the mixture at neutralization is 200–250 centipoises at 25° C. Also the dehydration is continued until not over 6% water is present and no ethanol is added.

*Preparation of resin "F"*

The preparation of resin "C" is repeated except that 5 parts of hydrated lime are used and after the initial reaction product reaches a viscosity of 16–18 centipoises at 25° C., the mixture is subjected to steam distillation for about 1 hour whereby steam distillable materials are eliminated and the viscosity rises to 25–30 centipoises at 25° C. Thereafter, the resorcinol is added and the dehydration carried out immediately, following the dehydration conditions of Example "C" except that the dehydration is continued until not over 6% water is present and no ethanol is added.

A mixture of 100 parts of resin "E," 100 parts of resin "F," 400 parts of propylene glycol and 10 parts of paraformaldehyde is prepared. The resulting product is admirably suited for purposes where a rapid cure is desired coupled with a high degree of resiliency of the cured product. For example, a mixture of 75 parts of 5–10 mesh cork and 25 parts of the above resin-glycol mixture is found to be advantageously used in forming gasket material. Thus, cured slabs 1" x 3" x 6" in dimensions may be formed by pressing at 105° C. for 2 hours. The product is found to have a tensile strength of at least 100 pounds per square inch which is the minimum requirement for gaskets for use in automobiles.

In contrast to the above results, when a conventional phenolic resin is substituted for the binder used in Example IV, 4.5–5 hours are required to achieve a tensile strength of 100 pounds per square inch.

Numerous variations may be introduced into the preparation of resin combinations for use as binding materials for cork particles and like materials. For example, in place of propylene glycol, other polyhydric alcohols having 2–8 carbon atoms may be used, such as glycerine, ethylene glycol, diethylene glycol, triethylene glycol, tetraethylene glycol and the like. In place of hexamethylenetetramine, other curing agents may be used, as for example, paraformaldehyde. Usually 2–10% of a curing agent based on the resin content of the resin-plasticizer mixture is used. While the amount of polyhydric alcohol in the compositions may be substantially varied, usually 100–300 parts are used for every 100 parts of the mixture of resins. As regards the ratio of the two resins, they should be so proportioned as to provide 25–45 parts of combined resorcinol for every 100 parts of combined phenol in the resin combination. The ratio of resin combination to cork particles may be substantially varied, but preferably 20–50 parts of the resin-polyhydric alcohol mixture are used for every 100 parts of cork.

The term "phenol" wherever it appears in the specification and claims is used to designate phenol ($C_6H_5OH$) specifically and not phenols generically.

It is to be understood that the above description is given by way of illustration only, and not of limitation, and that deviations are possible within the spirit of the invention.

What is claimed is:

1. A rapid-curing resin combination comprising a mixture of a liquid phenol-formaldehyde resin acidified to a pH of 4.5–7 said resin having been made under alkaline conditions and containing 2–3 mols of combined formaldehyde for each mol of phenol and a phenol-resorcinol-formaldehyde resin containing 1–1.5 mols of combined formaldehyde for each mol of phenol and 40–90 parts of combined resorcinol for every 100 parts of phenol, in such proportions as to produce a resorcinol: phenol ratio between 25:100 and 45:100 in the resin combination.

2. A resin combination as defined in claim 1 which also includes 2–10 parts of a formaldehyde-generating accelerating agent from the group consisting of paraformaldehyde and hexamethylenetetramine for every 100 parts of resin.

3. A resin combination as defined in claim 1 in which the phenol-formaldehyde resin is neutralized with lactic acid and the phenol-resorcinol-formaldehyde resin is made in the presence of an alkali earth metal hydroxide, and 2–10 parts of hexamethylene-tetramine is present for every 100 parts of the resin mixture.

4. A resin combination as defined in claim 1 in which the phenol-formaldehyde resin is acidified to a pH of 5–6 with lactic acid and the phenol-resorcinol-formaldehyde resin is made in the presence of 1–10 parts of calcium hydroxide for every 100 parts of phenol.

5. A rapid curing resin combination comprising a mixture of 50 parts of a liquid phenol-formaldehyde resin made by reacting 2–3 mols of formaldehyde with one mol of phenol at a pH of 8.5–9.5, followed by neutralization with lactic acid to a pH of 5–6, 50 parts of a phenol-resorcinol-formaldehyde resin, made in the presence of 3 parts of calcium hydroxide for every 100 parts of phenol and containing 1–1.5 mols of formaldehyde for each mol of phenol and 65 parts of combined resorcinol for every 100 parts of phenol and 5 parts of hexamethylenetetramine.

6. A resin combination as defined in claim 5 which also contains 100–300 parts of a polyhydric alcohol selected from the group consisting of glycerine and glycols having not more than 8 carbon atoms.

7. A resin combination as defined in claim 5 which also contains 200 parts of propylene glycol.

RAYMOND A. BARKHUFF, Jr.

REFERENCES CITED

The following references are of record in the file of this patent:

UNITED STATES PATENTS

| Number | Name | Date |
|---|---|---|
| 1,909,787 | Pantke | May 6, 1933 |
| 2,104,501 | Adams et al. | Jan. 4, 1938 |
| 2,334,904 | Cheetham | Nov. 23, 1943 |